United States Patent
Ting et al.

(10) Patent No.: US 9,788,277 B2
(45) Date of Patent: Oct. 10, 2017

(54) POWER SAVING MECHANISM FOR IN-POCKET DETECTION

(71) Applicant: MEDIATEK INC., Hsinchu (TW)

(72) Inventors: Yuan-Wen Ting, Taichung (TW); Chien-Hua Chen, Hsinchu (TW); Chien-Yu Lan, Kaohsiung (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 14/598,012

(22) Filed: Jan. 15, 2015

(65) Prior Publication Data
US 2016/0212710 A1   Jul. 21, 2016

(51) Int. Cl.
H04M 1/00       (2006.01)
H04W 52/02     (2009.01)
H04M 1/73       (2006.01)

(52) U.S. Cl.
CPC ..... H04W 52/0254 (2013.01); H04W 52/028 (2013.01); H04W 52/0267 (2013.01); H04W 52/0274 (2013.01); H04M 1/73 (2013.01); Y02B 60/50 (2013.01)

(58) Field of Classification Search
CPC ........ G06F 3/017; G06F 1/1652; G06F 3/041; G09G 5/006; H04W 52/0254; H04W 52/0267; H04W 52/0274; H04M 1/73
USPC ......................................................... 455/41
See application file for complete search history.

(56) References Cited

U.S. PATENT DOCUMENTS

| 7,728,316 B2 | 6/2010 | Fadell et al. ............. 250/559.38 |
| 2003/0197597 A1* | 10/2003 | Bahl ..................... G06F 1/3203 340/7.58 |
| 2006/0093161 A1 | 5/2006 | Falcon .......................... 381/104 |
| 2007/0004470 A1 | 1/2007 | Goris et al. ................... 455/574 |
| 2008/0081656 A1* | 4/2008 | Hiles ...................... G06F 1/1626 455/550.1 |
| 2008/0218535 A1* | 9/2008 | Forstall ................. G06F 1/3203 345/690 |
| 2010/0167783 A1* | 7/2010 | Alameh .............. H04M 1/0202 455/556.1 |
| 2011/0063098 A1* | 3/2011 | Fischer .............. G07C 9/00119 340/439 |
| 2011/0221691 A1* | 9/2011 | Lee ....................... G06F 1/1626 345/173 |
| 2011/0273378 A1* | 11/2011 | Alameh ............ H04M 1/72569 345/173 |
| 2011/0312349 A1* | 12/2011 | Forutanpour ......... G06F 1/1626 455/466 |
| 2012/0021808 A1* | 1/2012 | Tseng ................... G01C 21/265 455/575.1 |
| 2012/0035989 A1* | 2/2012 | Abel .................. G06Q 30/0207 705/14.1 |

(Continued)

Primary Examiner — Md Talukder
(74) Attorney, Agent, or Firm — Imperium Patent Works; Zheng Jin; Mark Marrello

(57) ABSTRACT

A method of efficient pocket detection is proposed. A wireless device determines whether it is in a transition state by using a plurality of low power-consuming sensors. The wireless device powers on a high power-consuming sensor if the device is in the transition state, or otherwise keeps the high power-consuming sensor off if the device is not in the transition state. The wireless device detects a current pocket mode of the device using the high power-consuming sensor if the device is in the transition state, or otherwise keeps a previous pocket mode if the device is not in the transition state.

18 Claims, 3 Drawing Sheets

(56) References Cited

U.S. PATENT DOCUMENTS

| | | | |
|---|---|---|---|
| 2012/0170177 A1* | 7/2012 | Pertuit | G01R 33/0023 361/679.01 |
| 2013/0017814 A1* | 1/2013 | Ali | G06F 1/1626 455/418 |
| 2013/0033418 A1* | 2/2013 | Bevilacqua | G06F 3/017 345/156 |
| 2013/0106710 A1 | 5/2013 | Ashbrook | 345/173 |
| 2013/0109443 A1* | 5/2013 | Eaton | H04W 52/0248 455/572 |
| 2013/0200118 A1* | 8/2013 | Johnson | A45C 11/00 224/246 |
| 2013/0326250 A1* | 12/2013 | Sullivan | G06F 1/3206 713/323 |
| 2014/0025973 A1* | 1/2014 | Schillings | H04Q 9/00 713/323 |
| 2014/0111415 A1* | 4/2014 | Gargi | G06F 3/017 345/156 |
| 2014/0146304 A1 | 5/2014 | Almalki | 356/51 |
| 2014/0157210 A1* | 6/2014 | Katz | G06F 3/017 715/863 |
| 2014/0247548 A1* | 9/2014 | Sharma | G06F 1/1626 361/679.27 |
| 2014/0274159 A1* | 9/2014 | Bernheim Brush | G06F 17/18 455/456.4 |
| 2014/0292674 A1* | 10/2014 | Lee | G09G 5/006 345/173 |
| 2014/0342663 A1* | 11/2014 | Eaton | H04M 1/04 455/41.1 |
| 2014/0349629 A1* | 11/2014 | Chan | H04W 8/22 455/418 |
| 2014/0349632 A1* | 11/2014 | Chan | H04W 8/22 455/418 |
| 2015/0031347 A1* | 1/2015 | Kim | H04M 1/0245 455/418 |
| 2015/0230183 A1* | 8/2015 | Stogaitis | H04W 52/0254 455/574 |
| 2015/0253351 A1* | 9/2015 | Sadasivam | G06F 3/017 702/141 |
| 2015/0296328 A1* | 10/2015 | van der Lee | H04B 1/3888 455/41.1 |
| 2016/0061600 A1* | 3/2016 | Dharawat | G06F 1/3231 702/150 |
| 2016/0212710 A1* | 7/2016 | Ting | H04W 52/0254 |

* cited by examiner

POWER SAVING MECHANISM FOR IN-POCKET DETECTION

TECHNICAL FIELD

The disclosed embodiments relate generally to mobile communication networks, and, more particularly, to power saving mechanism for in pocket detection.

BACKGROUND

Mobile electronic devices such as handheld devices, media players, cellular phones, smartphones, and other tablet-based devices are rapidly becoming ubiquitous throughout the world. More and more sensors are being embedded into mobile electronic devices to enable a new generation of personal and environmental context aware applications. Typical phone placement contexts include "in pocket" (inPocket), "in bag" (inBag), "out of pocket or bag", "in hand" (inHand), or "on table" (onTable). Efficient recognition of these low-level contexts on the device is a fundamental building block for other new emerging sensing applications.

Recognizing the placement contexts can improve the accuracy of recognizing other contexts. For example, if a phone is detected out of pocket or bag, the onTable context can be better detected by further estimating the gravity vector on a surface and signal magnitude variance from accelerometer sensor, and the inHand context can be better detected by further inspecting signal vibration signatures from accelerometer and gyroscope sensors. In accelerometer-based physical activity recognition, the accelerometer sensor generates different signals when the phone is in a pocket, in a bag, or out of them. If the placement context of the phone is known, a placement-dependent algorithm can be created to improve the recognition accuracy. Moreover, the inPocket context recognition can enable a new mode called "pocket mode" in which the phone screen can be automatically locked, the volume of an incoming call automatically increased and vibration turned on. Similarly, if the phone is detected in a bag ("bag mode"), the ringtone time for an incoming all can be automatically increased to give users enough time to take the phone out.

Because most continuous context aware applications running on mobile phones are resource intensive and power consuming, there is a need to develop efficient recognition algorithms. Currently, proximity sensor, ultra-sonic sensor, light sensor, accelerometer sensor, and other sensing devices have all been applied to detect phone placement contexts. While there has been significant research efforts in the area of context awareness, it is desirable for an accurate, robust, and energy-efficient recognition algorithm that can automatically detect low-level phone placement contexts.

SUMMARY

A method of efficient in-pocket detection is proposed. A wireless device first determines whether it is in a transition state by using a plurality of low power-consuming sensors. The wireless device then powers on a high power-consuming sensor if the device is in the transition state, or otherwise keeps the high power-consuming sensor off if the device is not in the transition state. The wireless device detects a current pocket mode of the wireless device using the high power-consuming sensor if the device is in the transition state, or otherwise keeps a previous pocket mode if the device is not in the transition state.

In one embodiment, the low power-consuming sensors comprises an accelerometer sensor and an ambient light sensor, and the high power-consuming sensor is a proximity sensor or an ultrasonic sensor. Both the accelerometer sensor and the ambient light sensor are always turned on to detect the transition state of the device. In one example, the transition state is detected if the accelerometer sensor detects movement of the device. In another example, the transition state is detected if the ambient light sensor detects light change surrounding the device. The high power-consuming sensor is then controlled by whether the device is in the transition state or not. For example, the proximity sensor or the ultrasonic sensor is turned on to detect the current pocket mode if the device is in transition state. Otherwise, the proximity sensor or the ultrasonic sensor is kept off to save power and the device keeps its previous detected pocket mode. By controlling the high power-consuming sensors via low power-consuming sensors, accurate pocket mode detection can be achieved with reduced power consumption.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
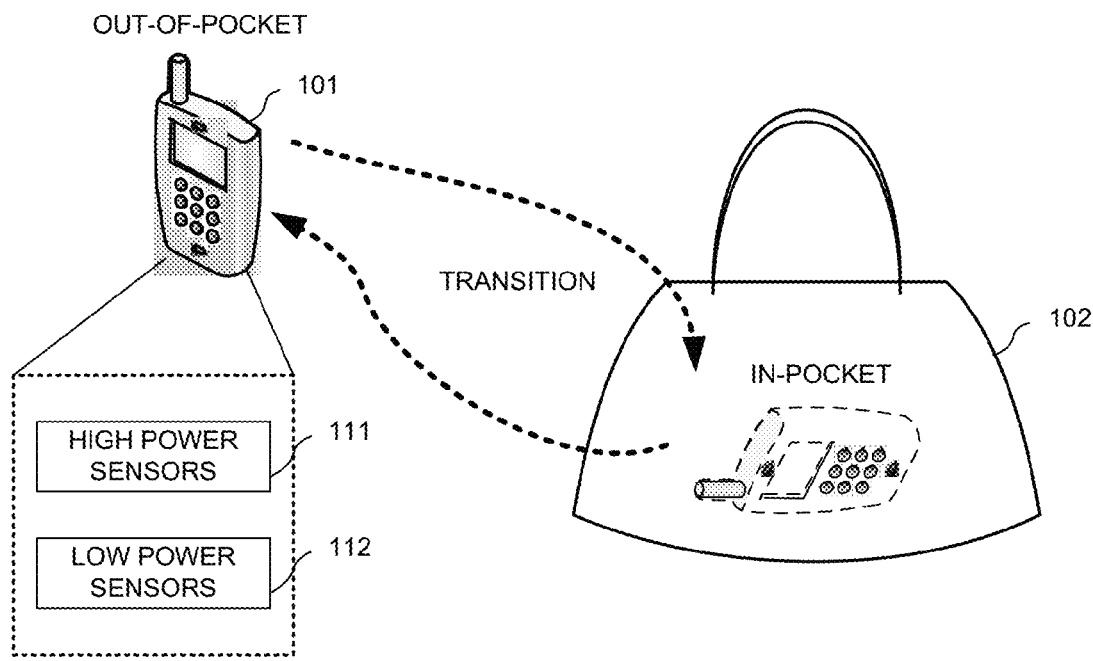
FIG. 1 shows a mobile electronic device with automatic placement context detection in accordance with one novel aspect.

FIG. 1 shows a mobile electronic device 101 with automatic placement context detection in accordance with one novel aspect. In the example of FIG. 1, mobile electronic device 101 is a handheld device, e.g., a smartphone that can be carried and positioned by users in different ways and in different environment. For example, mobile electronic device 101 can be carried or temporarily placed in pockets, covers, bags, purses, backpacks, set it on tables or counters, and hold it in hands etc. To detect such personal and environmental placement context information, more and more sensors are embedded into the mobile electronic device. For example, various sensor-based self-evaluation techniques have been developed to infer where a phone is placed within the environment relative to a user. Typical phone placement contexts include "in pocket" (inPocket), "in bag" (inBag), "out of pocket or bag", "in hand" (inHand), or "on table" (onTable). Efficient recognition of these low-level contexts on the phone is a fundamental building block for other new emerging sensing applications.

A proximity sensor is a sensor able to detect the presence of nearby objects with out any physical contact. A proximity sensor often emits an electromagnetic field or a beam of electromagnetic radiation (e.g., infrared), and looks for changes in the field or return signal. Proximity sensors are commonly used on smartphones to detect (and skip) accidental touchscreen taps when held to the ear during a call. For example, a proximity sensor deactivates the display and touchscreen when the smartphone brought near the face during a call. This is done to save battery power and to prevent inadvertent inputs from the user's face and ears. In addition, proximity sensors are commonly used to detect one placement. By detecting the presence of nearby objects, proximity sensors are able to accurately detect whether a smartphone is put in a pocket/cover/bag or taken out of pocket/cover/bag.

Ultrasonic sensors evaluate attributes of a target by interpreting the echoes from radio or sound waves respectively. Active ultrasonic sensors generate high frequency sound waves and evaluate the echo that is received back by the sensor, measuring the time interval between sending the signal and receiving the echo to determine the distance to an object. Passive ultrasonic sensors are microphones that detect ultrasonic noise that is present under certain conditions. Similar to proximity sensors, ultrasonic sensors can be used on smartphones to accurately detect phone placement.

An accelerometer is a sensing device that measures proper acceleration (g-force), which is the acceleration it experiences relative to freefall and is the acceleration felt by people and objects. While smartphones often use accelerometers for user interface control, they can be used to recognize phone placement.

An ambient light sensor is a type of sensor of light or other electromagnetic energy. An ambient light sensor recognizes ambient lighting conditions surrounding the phone, and then adjusts the display brightness to save battery power. Ambient light sensors are also used to infer phone placement. For example, a good lighting condition typically infers the device is outside a pocket, while a poor lighting condition typically infers the device is inside a pocket.

Among the different sensors, proximity sensors and ultrasonic sensors are more reliable in terms of accurate placement detection. While accelerometer and ambient light sensors can infer phone placement based on movement of the phone and lighting conditions surrounding the phone, such inference is not always accurate as to the actual placement of the phone. On the other hand, proximity sensors and ultrasonic sensors are able to more accurately detect phone placement. However, proximity or ultrasonic sensor is power consuming. As a result, related continuous context aware applications running on mobile phones are resource intensive and power consuming.

In accordance with one novel aspect, lower power-consuming sensors such as accelerometer and ambient light are used to control the ON/OFF for high power-consuming sensors such as proximity sensor and ultrasonic sensor for phone placement detection. In the example of FIG. 1, smartphone 101 has two "pocket modes", a first in-pocket mode when it is placed inside a pocket, phone cover, purse, or a bag/backpack, and a second out-of-pocket mode when it is placed outside a pocket, phone cover, purse, or a bag/backpack. For example, when smartphone 101 is placed inside purse 102, it is in the in-pocket mode; when smartphone 101 is taken out of purse 102, it is in the out-of-pocket mode.

Smartphone 101 comprises a plurality of low power-consuming sensors 111 and a plurality of high power-consuming sensors 112. While each sensor has its own usage, the combination of the sensors can be used to more efficiently detect the pocket mode of the phone. The low power-consuming sensors, e.g., accelerometer and ambient light are always on for detecting any possible transition of environment change of the smartphone. On the other hand, the high power-consuming sensors, e.g., proximity and ultrasonic sensors are controlled based on whether there is any environment change of the smartphone. If there is no environment change, then the high power-consuming sensors are kept off to save power. When possible environment change is detected, then one of the high power-consuming sensors is turned on to further determine the current pocket mode of the smartphone. By controlling the high power-consuming sensors via low power-consuming sensors, accurate pocket mode detection can be achieved with reduced power consumption.

Figure 2:
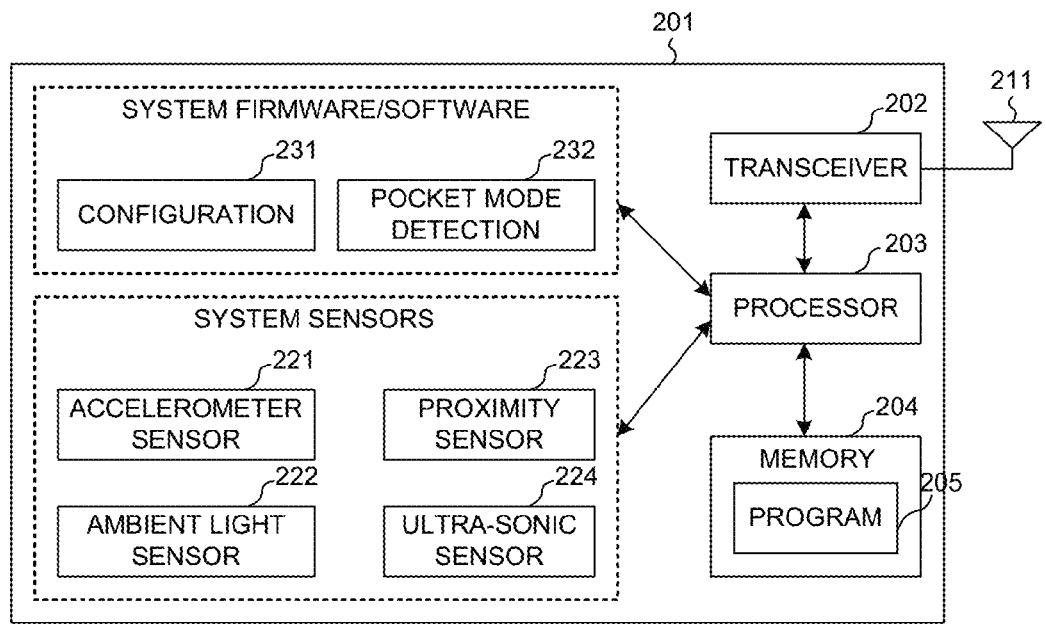
FIG. 2 is a simplified block diagram of a mobile electronic device that supports embodiments of the present invention.

FIG. 2 is a simplified block diagram of a mobile electronic device 201 that supports embodiments of the present invention. Device 201 is a smartphone having RF transceiver module 202, coupled with antenna 211, receives RF signals from antenna 211, converts them to baseband signals and sends them to processor 203. RF transceiver 202 also converts received baseband signals from the processor 203, converts them to RF signals, and sends out to antenna 211. Processor 203 processes the received baseband signals and invokes different functional modules to perform features in the smartphone. Memory 204 stores program instructions and data 205 to control the operations of the smartphone.

FIG. 2 further illustrates functional modules and system sensors in smartphone 201 that carry out embodiments of the current invention. The functional modules may be implemented by hardware, firmware, software, or any combination thereof. The function modules, when executed by processors 203 (e.g., via executing program codes 205), for example, allow smartphone 201 to perform efficient in-pocket detection by using a plurality of sensors. In one example, smartphone 201 is embedded with system sensors including accelerometer sensor 221, ambient light sensor 222, proximity sensor 223, and ultrasonic sensor 225. The accelerometer 221 and the ambient light 222 have low power consumption and are always on for detecting any possible transition of environment change of the smartphone. If potential environment change is detected, then either the proximity sensor 223 or the ultrasonic sensor 224 is turned on to further determine the current pocket mode of the smartphone with accuracy and reduced power consumption. If no environment change is detected, then both the proximity sensor 223 and the ultrasonic sensor 224 are turned off to save power consumption.

Figure 3:
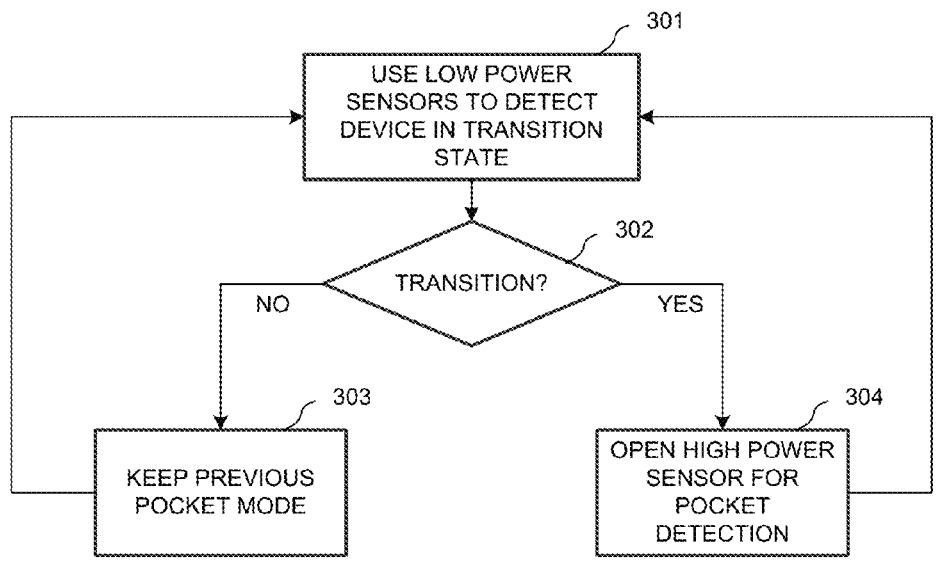
FIG. 3 illustrates a flow diagram of an efficient placement context detection by controlling different power level sensors.

FIG. 3 illustrates a flow diagram of an efficient placement context detection by controlling different power level sensors. For placement context, a mobile electronic device has two pocket modes, e.g., an in-pocket mode or an out-of-pocket mode. In step 301, the mobile electronic device uses low power sensors to detect whether the device is in transition state. The transition state is defined as a state during which the device incurs an environmental change, which potentially changes the device pocket mode. More specifically, such environmental change infers the device is being taken out of a pocket or being put into a pocket, often accompanied by movement of the device and/or lighting condition changes surrounding the device. Therefore, the transition state can be detected by low power sensors including accelerometer and ambient light. In step 302, if the device does not detect transition state, then it goes to step 303 and keeps the previous pocket mode. If the device detects transition state, then it goes to step 304 and turns on a high power sensor for updated pocket mode detection. Note that the high power sensor is turned on only during transition state for accurate pocket mode detection, and is turned off during normal state when the device has no environmental changes. As a result, efficient pocket mode detection can be achieved with reduced power consumption.

Figure 4:
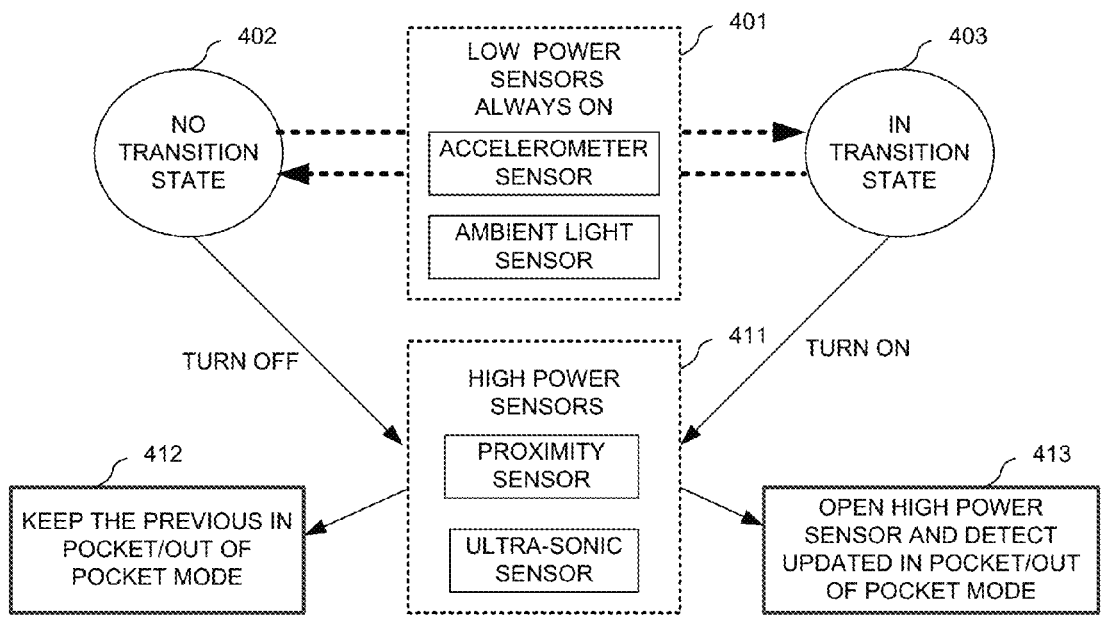
FIG. 4 is a more detailed flow diagram that illustrates an efficient pocket mode detection in accordance with one novel aspect.

FIG. 4 is a more detailed flow diagram that illustrates an efficient pocket mode detection of a smartphone in accordance with one novel aspect. In step 401, the smartphone keeps the low power sensors always on. The low power sensors include an accelerometer sensor and an ambient light sensor. The low power sensors can be used for different purposes. For example, the accelerometer sensor is often used for user interface control in smartphones, and the ambient light sensor is used to adjust the di brightness. The low power sensors, however, can also be used to detect whether the smartphone in transition state. If the smartphone is not in transition state (402), then it infers that there is no pocket mode change. If the smartphone is in transition state (403), then it infers potential pocket mode change. The transition state can be detected by either the accelerometer sensor or the ambient light sensor. In one example, when the phone is being taken out from a purse or put into a purse, the accelerometer sensor detects movement, which results in the detection of transition state. In another example, when the phone is being taken out from a purse or put into a purse, the ambient light sensor detects lighting condition change, which also results in the detection of transition state.

Such transition state, however, does not necessarily means that the smartphone has changed its pocket mode. For example, if a user carries the smartphone while doing exercise, then the smartphone detected to be in transition state by the accelerometer during the entire exercising time. However, the smartphone may be inPocket or inHand the whole time and has no change of pocket mode. Similarly, if the smartphone is placed in a room with lights on, when a user turns off the lights, the smartphone is detected to be in transition state by the ambient light without changing its pocket mode. Therefore, in order to accurately determine any pocket mode change, high power sensors such as proximity sensor or ultrasonic sensor need to be used as well.

In accordance with one novel aspect, the high power sensors are controlled by the determined transition state to reduce power consumption (step 411). If the smartphone is not in transition state, then the smartphone turns off the high power sensors and keeps the previous pocket mode (step 412). On the other hand, if the smartphone is in transition state, then the smartphone turns on one of the high power sensors to detect updated pocket mode (step 413). By controlling the high power-consuming sensors via low power-consuming sensors, pocket mode detection can be achieved with the same accuracy and reduced power consumption.

Figure 5:
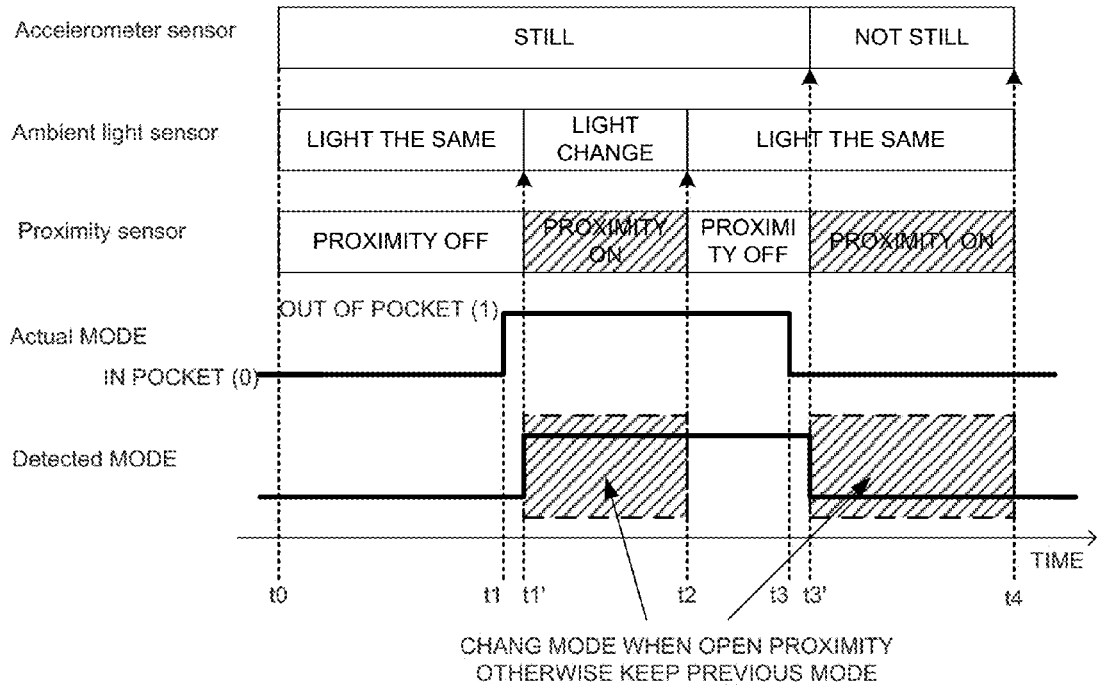
FIG. 5 illustrates one embodiment of an efficient pocket mode detection algorithm in accordance with one novel aspect.

FIG. 5 illustrates one embodiment of an efficient pocket mode detection algorithm in accordance with one novel aspect. In the example of FIG. 5, a mobile electronic device is equipped with an accelerometer sensor, an ambient light sensor, and a proximity sensor. The accelerometer sensor and the ambient light sensor are both low power-consuming sensors, while the proximity sensor is a high power-consuming sensor. The low power-consuming sensors are always on, while the high power-consuming sensor is controlled based on sensing result of the low power-consuming sensors. The mobile electronic device has two placement modes: an in-pocket mode and an out-of-pocket mode. The actual pocket mode of the device is as follows: the device has in-pocket mode from time t0 to time t1, has out-of-pocket mode from time t1 to time t3, and has in-pocket mode from time t3 to t4.

At time t0, the device has in-pocket mode. From time t0 to time t1, the accelerometer sensor detects the device is still, and the ambient light sensor detects the lighting condition is the same. As a result, the device keeps the proximity sensor off and keeps the previous detected in-pocket mode. At time t1, the device is taken out of pocket and changes its pocket mode to out-of-pocket mode. At time t1', the accelerometer sensor does not detect any movement, but the ambient light sensor detects lighting condition change with a delay time (t1'-t1). As a result, the device turns on the proximity sensor at time t1'. The proximity sensor detects the current pocket mode is changed from in-pocket mode to out-of-pocket mode at time t1'. At time t2, the ambient light sensor no longer detects light change and thus turns off the proximity sensor to save power consumption. At time t3, the device is put into pocket and changes its pocket mode to in-pocket mode. At time t3', the ambient light sensor does not detect any lighting condition change, but the accelerometer sensor detects movement of the device with a delay time (t3'-t3). As a result, the device turns on the proximity sensor at time t3'. The proximity sensor detects the current pocket mode is changed from out-of-pocket mode to in-pocket mode at time t3'. At time t4, the accelerometer sensor no longer detects movement and thus turns off the proximity sensor to save power consumption. From this example, it can be seen that the proximity sensor is turned on only during transition state periods from time t1' to time t2, and from time t3' to time t4. Based on the transition state detection, the proximity sensor is turned on and off to more efficiently detect the device pocket mode with reduced power consumption.

Figure 6:
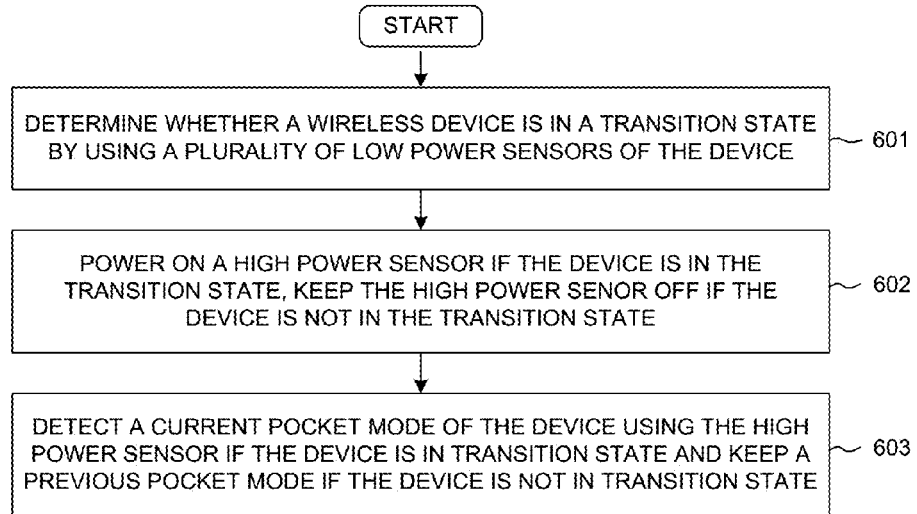
FIG. 6 is a flow chart of one embodiment of a method of automatic placement context detection in accordance with one novel aspect.

FIG. 6 is a flow chart of one embodiment of a method of automatic placement context detection in accordance with one novel aspect. In step 601, a wireless device determines whether it is in a transition state by using a plurality of low power-consuming sensors. In step 602, the wireless device powers on a high power-consuming sensor if the device is in the transition state, or otherwise keeps the high power-consuming sensor off if the device is not in the transition state. In step 603, the wireless device detects a current pocket mode of the device using the high power-consuming sensor if the device is in the transition state, or otherwise keeps a previous pocket mode if the device is not in the transition state.

In one embodiment, the low power-consuming sensors comprises an accelerometer sensor and an ambient light sensor, and the high power-consuming sensor is a proximity sensor or an ultrasonic sensor. Both the accelerometer sensor and the ambient light sensor are always turned on to detect the transition state of the device. In one example, the transition state is detected if the accelerometer sensor detects movement of the device. In another example, the transition state is detected if the ambient light sensor detects light change surrounding the device. The high power-consuming sensor is then controlled by whether the device is in the transition state or not. For example, the proximity sensor or the ultrasonic sensor is turned on to detect the current pocket mode if the device is in transition state. Otherwise, the proximity sensor or the ultrasonic sensor is kept off to save power and the device keeps its previous detected pocket mode. By controlling the high power-consuming sensors via low power-consuming sensors, accurate pocket mode detection can be achieved with reduced power consumption.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   determining whether a wireless device is in a transition state by using a plurality of low-power consumption sensors, wherein the wireless device comprises the plurality of low-power consumption sensors;
   powering on a single high-power consumption sensor only when the wireless device is in the transition state, otherwise keeping the high-power consumption sensor off when the wireless device is not in the transition state, wherein the wireless device comprises the high-power consumption sensor; and
   detecting a current pocket mode of the wireless device using the high-power consumption sensor when the device is in the transition state, otherwise keeping a previous pocket mode when the wireless device is not in the transition state.

2. The method of claim 1, wherein the plurality of low-power consumption sensors comprises an accelerometer sensor and an ambient light sensor.

3. The method of claim 2, wherein the wireless device is in the transition state when the accelerometer sensor detects movement of the wireless device.

4. The method of claim 2, wherein the wireless device is in the transition state when the ambient light sensor detects lighting change surrounding the device.

5. The method of claim 1, wherein the high-power consumption sensor is a proximity sensor.

6. The method of claim 1, wherein the high-power consumption sensor is an ultra-sonic sensor.

7. The method of claim 1, wherein the pocket mode comprises an in-pocket mode and an out-of-pocket mode.

8. The method of claim 7, wherein the wireless device starts one or more corresponding actions upon detecting the in-pocket mode of the wireless device.

9. The method of claim 8, wherein the actions comprises turning off a screen, preventing pocket dial, increasing ringer volume, and switching from vibrate to ring.

10. A wireless device, comprising:
    a plurality of low-power consumption sensors that determines when a wireless device is in a transition state, wherein the low-power consumption sensors are used to determine when the wireless device is in a transition state;
    a high-power consumption sensor for detecting a pocket mode of the wireless device; and
    a pocket detection module that powers on the high-power consumption sensor only when the wireless device is in the transition state, wherein the pocket detection module keeps the high-power consumption sensor off when the wireless device is not in the transition state.

11. The wireless device of claim 10, wherein the plurality of low-power consumption sensors comprises an accelerometer sensor and an ambient light sensor.

12. The wireless device of claim 11, wherein the wireless device is in the transition state when the accelerometer sensor detects movement of the wireless device.

13. The wireless device of claim 11, wherein the wireless device is in the transition state when the ambient light sensor detects lighting change surrounding the device.

14. The wireless device of claim 10, wherein the high-power consumption sensor is a proximity sensor.

15. The wireless device of claim 10, wherein the high-power consumption sensor is an ultra-sonic sensor.

16. The wireless device of claim 10, wherein the pocket mode comprises an in-pocket mode and an out-of-pocket mode.

17. The wireless device of claim 16, wherein the wireless device starts one or more corresponding actions upon detecting the in-pocket mode of the device.

18. The wireless device of claim 17, wherein the actions comprises turning off a screen, preventing pocket dial, increasing ringer volume, and switching from vibrate to ring.

* * * * *